United States Patent

Cismas

(10) Patent No.: US 10,085,016 B1
(45) Date of Patent: Sep. 25, 2018

(54) VIDEO PREDICTION CACHE INDEXING SYSTEMS AND METHODS

(71) Applicant: Ovics, Saratoga, CA (US)

(72) Inventor: Sorin C Cismas, Saratoga, CA (US)

(73) Assignee: OVICS, Saratoga, CA (US)

( * ) Notice: Subject to any disclaimer, the term of this patent is extended or adjusted under 35 U.S.C. 154(b) by 792 days.

(21) Appl. No.: 13/745,724

(22) Filed: Jan. 18, 2013

(51) Int. Cl.

| | |
|---|---|
| *H04N 7/12* | (2006.01) |
| *H04N 11/02* | (2006.01) |
| *H04N 11/04* | (2006.01) |
| *H04N 19/50* | (2014.01) |
| *G06F 12/02* | (2006.01) |
| *H04N 19/42* | (2014.01) |
| *H04N 19/433* | (2014.01) |
| *H04N 19/423* | (2014.01) |

(52) U.S. Cl.
CPC ... *H04N 19/00569* (2013.01); *G06F 12/0246* (2013.01); *H04N 19/42* (2014.11); *H04N 19/423* (2014.11); *H04N 19/433* (2014.11)

(58) Field of Classification Search
CPC .............................. H04N 19/423; H04N 19/42
USPC ..................................... 375/240.12; 3/240.12
See application file for complete search history.

(56) References Cited

U.S. PATENT DOCUMENTS

| | | |
|---|---|---|
| 5,251,030 A | 10/1993 | Tanaka |
| 5,448,310 A | 9/1995 | Kopet et al. |
| 5,453,786 A | 9/1995 | Trent |
| 5,486,876 A | 1/1996 | Lew et al. |
| 5,675,387 A | 10/1997 | Hoogenboom et al. |
| 5,717,441 A | 2/1998 | Serizawa et al. |
| 5,736,988 A | 4/1998 | Shaw et al. |
| 5,751,364 A | 5/1998 | Yasuda et al. |
| 5,973,985 A | 10/1999 | Ferrant |

(Continued)

FOREIGN PATENT DOCUMENTS

WO     2002056600 A1     7/2002

OTHER PUBLICATIONS

Zhou et al., "More Results on Restriction on Vector Spread-Out in 8×8 Partitioning Mode," Joint Video Team of ISO/IEC MPEG & ITU-T VCEG, p. 1-18, Oct. 9, 2002.

(Continued)

*Primary Examiner* — Jeremaiah C Hallenbeck-Huber
(74) *Attorney, Agent, or Firm* — Meyertons, Hood, Kivlin, Kowert & Goetzel, P.C.

(57) ABSTRACT

In some embodiments, a video prediction (reference block) cache includes multiple (e.g. 4) independently-addressable subcaches, each storing a predetermined part of a cache back-end (memory subsystem) word. For example, a 16-byte word received by the cache from memory may be split between four 4-byte subcaches. Each subcache line/block stores the data of a 2-D pixel array. Retrieving a cached prediction may be performed by accessing different subcaches synchronously (on the same clock cycle) to assemble the prediction from parts stored in different subcaches. A cache tag may be defined by a 4-D vector having x-position, y-position, frame ID, and color component (luma/chroma) fields. Using sub-word, independently-addressable subcaches allows increasing the efficiency of cache access and allows addressing memory bandwidth limitations facing emerging video coding standards and applications, which employ relatively large and varied prediction sizes.

20 Claims, 4 Drawing Sheets

(56) References Cited

U.S. PATENT DOCUMENTS

| | | |
|---|---|---|
| 6,005,624 A | 12/1999 | Vainsencher |
| 6,081,209 A | 6/2000 | Schuyler et al. |
| 6,145,073 A | 11/2000 | Cismas |
| 6,154,413 A | 11/2000 | Longwell et al. |
| 6,289,050 B1 | 9/2001 | Ohtani et al. |
| 6,301,299 B1 | 10/2001 | Sita et al. |
| 6,335,950 B1 | 1/2002 | Kohn |
| 6,400,763 B1 | 6/2002 | Wee |
| 6,411,652 B1 | 6/2002 | Sivan |
| 6,549,576 B1 | 4/2003 | Moriyoshi |
| 6,567,556 B1 | 5/2003 | Bramley |
| 6,707,853 B1 | 3/2004 | Cook et al. |
| 6,934,332 B1 | 8/2005 | Auyeung et al. |
| 7,093,094 B2 | 8/2006 | Cismas |
| 7,870,365 B1 | 1/2011 | Cismas et al. |
| 8,165,219 B2 | 4/2012 | Cismas |
| 8,325,798 B1 | 12/2012 | Cismas |
| 2001/0055427 A1 | 12/2001 | Freeman |
| 2002/0041631 A1 | 4/2002 | Arita et al. |
| 2003/0142872 A1 | 7/2003 | Koyanagi |
| 2006/0050976 A1 | 3/2006 | Molloy |
| 2008/0285652 A1* | 11/2008 | Oxman et al. ........... 375/240.16 |
| 2008/0292276 A1 | 11/2008 | Horvath et al. |
| 2009/0077319 A1* | 3/2009 | Kurokawa ............ G06F 1/3225 711/128 |
| 2009/0157982 A1* | 6/2009 | MacInnis ............ G06F 12/0875 711/145 |
| 2012/0089782 A1* | 4/2012 | McKean ............. G06F 12/0804 711/122 |
| 2012/0303900 A1* | 11/2012 | Engh-Halstvedt .... G06F 3/0238 711/125 |
| 2013/0191600 A1* | 7/2013 | Kuesel ................... G06F 13/28 711/136 |
| 2014/0071146 A1* | 3/2014 | Sanghvi et al. .............. 345/557 |

OTHER PUBLICATIONS

ITU-T Recommendation H.262 (Jul. 1995).

Kim et al., Array Address Translation for SDRAM-Based Video Processing Applications, Proc. of SPIE Visual Communications and Image Processing 2000, Year 2000, vol. 4067.

International Organization for Standardisation, "Text of Final Committee Draft of Joint Video Specification (ITU-T Rec. H.264/ISO/IEC 14496-10 AVC)," Jul. 2002, pp. i-xv, 1-197.

* cited by examiner

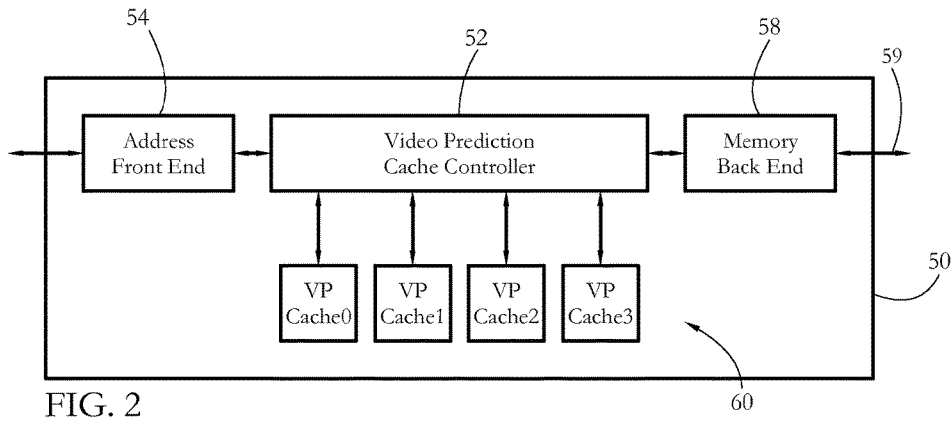
FIG. 2
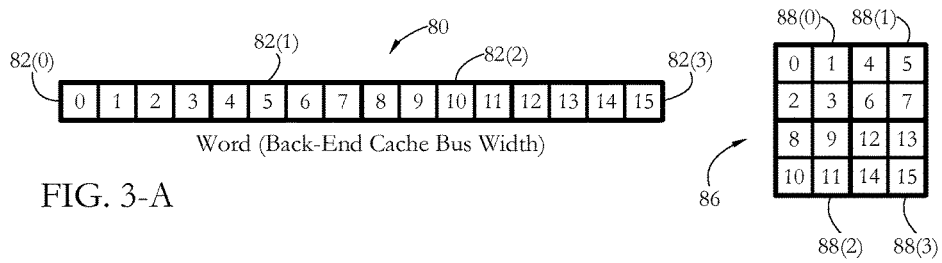
FIG. 3-A
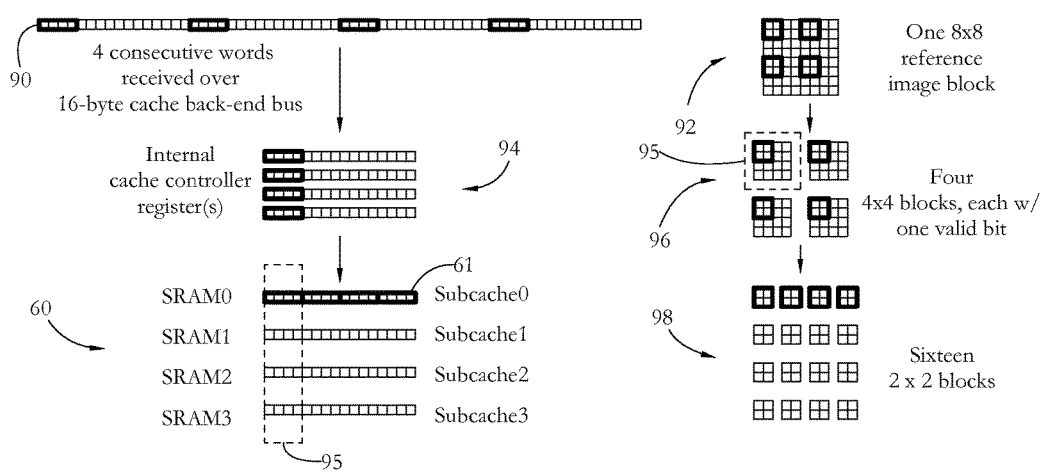
FIG. 3-B

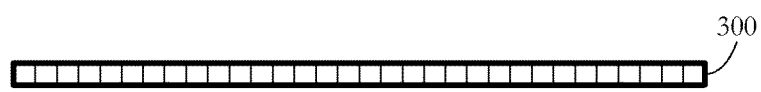
Back-End Cache Word (Back-End Cache Bus Width)
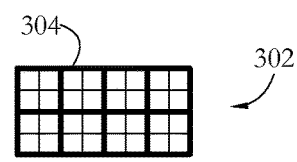
FIG. 7
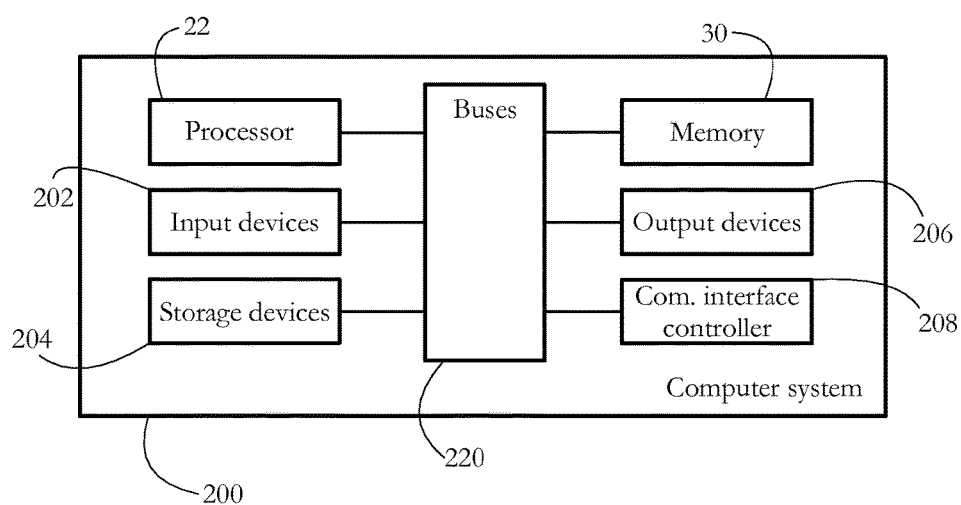
FIG. 8

VIDEO PREDICTION CACHE INDEXING SYSTEMS AND METHODS

BACKGROUND OF THE INVENTION

The invention relates to video data processing, an in particular to video data caching systems and methods.

Video processing, be it video compression, video decompression, or image processing in general, makes use of large amounts of data which are typically organized in video frames (pictures). Video coding (encoding and decoding) often requires accessing data from one or more frames in a non-sequential fashion. For example, encoding or decoding neighboring blocks in a frame may require accessing predictions (reference blocks) that are not neighbors.

As resolutions and frame rates keep growing, memory bandwidth can become a primary limitation for high performance and power consumption. Future compression standards like HEVC (H.265 or MPEG-H) use a large variety of prediction modes and larger interpolation filters for motion predictions. Such processing demands can exacerbate the memory bandwidth problem.

Caching can reduce the memory bandwidth used by video coding applications. Caching involves storing data locally, in a cache. If requested data is present in a cache, the data is served directly from the cache, rather than from memory. While caching can significantly speed up access to data, conventional caching systems may display suboptimal performance in handling the increasingly-challenging demands of emerging video coding applications.

SUMMARY OF THE INVENTION

According to one aspect, an integrated circuit comprises a video coding circuit; and a video prediction cache connected to the video coding circuit, the video prediction cache being connected to a random access memory over a back-end bus having a width defining a cache back-end word size, the video prediction cache being configured to cache video prediction data. The video prediction cache comprises: a plurality of independently- and synchronously-addressable video prediction subcaches, each configured to store a predetermined subfield of a cache back-end word received from memory; and a cache controller connected to the plurality of subcaches, configured to control a synchronous read of multiple subcaches of the plurality of subcaches in response to receiving a video prediction read request from the video coding circuit, to generate a video prediction for transmission to the video coding circuit.

According to another aspect, a method comprises: employing a video coding circuit to perform a video coding operation; caching in a video prediction cache video prediction data retrieved from a random access memory over a back-end bus having a width defining a cache back-end word size, wherein caching the video prediction data in the video prediction cache comprises distributively storing a cache back-end word received from memory into a plurality of independently- and synchronously-addressable video prediction subcaches, each of the plurality of subcaches being configured to store a predetermined field of the cache back-end word; and synchronously reading video data from the plurality of subcaches in response to receiving a video prediction read request from the video coding circuit, to generate at least part of a video prediction for transmission to the video coding circuit, the at least part of the video prediction including data from multiple subcaches of the plurality of subcaches.

According to another aspect, an integrated circuit comprises: a processor; and a cache connected to the processor, wherein the cache is connected to a random access memory over a memory-subsystem cache bus, the cache being configured to cache data retrieved from the random access memory. The cache comprises: a plurality of independently- and synchronously-addressable subcaches, each configured to store a predetermined subfield of a memory-subsystem bus word received from memory; and a cache controller connected to the plurality of subcaches, configured to control a synchronous read of multiple subcaches of the plurality of subcaches in response to receiving a read request from the processor.

According to another aspect, a method comprises: caching a memory-subsystem cache bus word received at a cache from memory over a memory-subsystem cache bus, wherein caching the memory-subsystem cache bus word comprises distributing predetermined fields of the memory-subsystem cache bus word to a corresponding plurality of independently- and synchronously-addressable subcaches of the cache; and in response to receiving at the cache a read request from a processor, synchronously reading cached data from multiple subcaches of the plurality of subcaches for assembly into a response to be transmitted to the processor.

BRIEF DESCRIPTION OF THE DRAWINGS

The foregoing aspects and advantages of the present invention will become better understood upon reading the following detailed description and upon reference to the drawings where:

FIG. 2 shows the internal structure of a video prediction cache according to some embodiments of the present invention.

FIG. 3-A shows an exemplary 16-byte word received by a video prediction cache from memory, and an associated 4×4 video image prediction according to some embodiments of the present invention.

FIG. 3-B illustrates a distribution of bytes from an exemplary 64-byte word received by a video prediction cache from memory into four independently-addressable subcaches, according to some embodiments of the present invention.

FIG. 7 shows an exemplary 32-byte cache back-end word and associated 8×4 video image prediction according to some embodiments of the present invention.

FIG. 8 shows an exemplary computer system according to some embodiments of the present invention.

DETAILED DESCRIPTION OF THE INVENTION

The following description illustrates the present invention by way of example and not necessarily by way of limitation. Any reference to an element is understood to refer to at least one element. A set of elements is understood to include one or more elements. A plurality of elements includes at least two elements, and multiple elements refers to at least two elements. Unless otherwise specified, each recited element or structure can be formed by or be part of a single structure or unit, or be formed from multiple distinct structures or units. Unless otherwise specified, any recited connections can be direct connections or indirect operative connections established through intermediary circuit elements or structures. The statement that two or more events or actions happen synchronously is understood to mean that the events/action happen on the same clock cycle. Unless otherwise specified, the term "access" is used below to encompass read and write transactions; in the context of a read transaction, accessing data refers to reading data, while in the context of a write transaction, accessing data refers to writing data.

The following description illustrates embodiments of the invention by way of example and not necessarily by way of limitation.

FIG. 8 shows an exemplary data processing system 200 according to some embodiments of the present invention. One or more buses 220 connect a microprocessor (CPU) 22, memory (e.g. DRAM) 30, input devices (e.g. mouse, keyboard) 202, output devices (e.g. display, speakers, haptic/vibration generator) 206, storage devices (e.g. hard drive, solid state drive) 204, and a communication interface controller (e.g. network interface card) 308. The illustrated computer system 20 may be a server, personal computer, tablet, or mobile communication device (e.g. smartphone) capable of performing video coding (encoding and/or decoding) operations.

Figure 1:
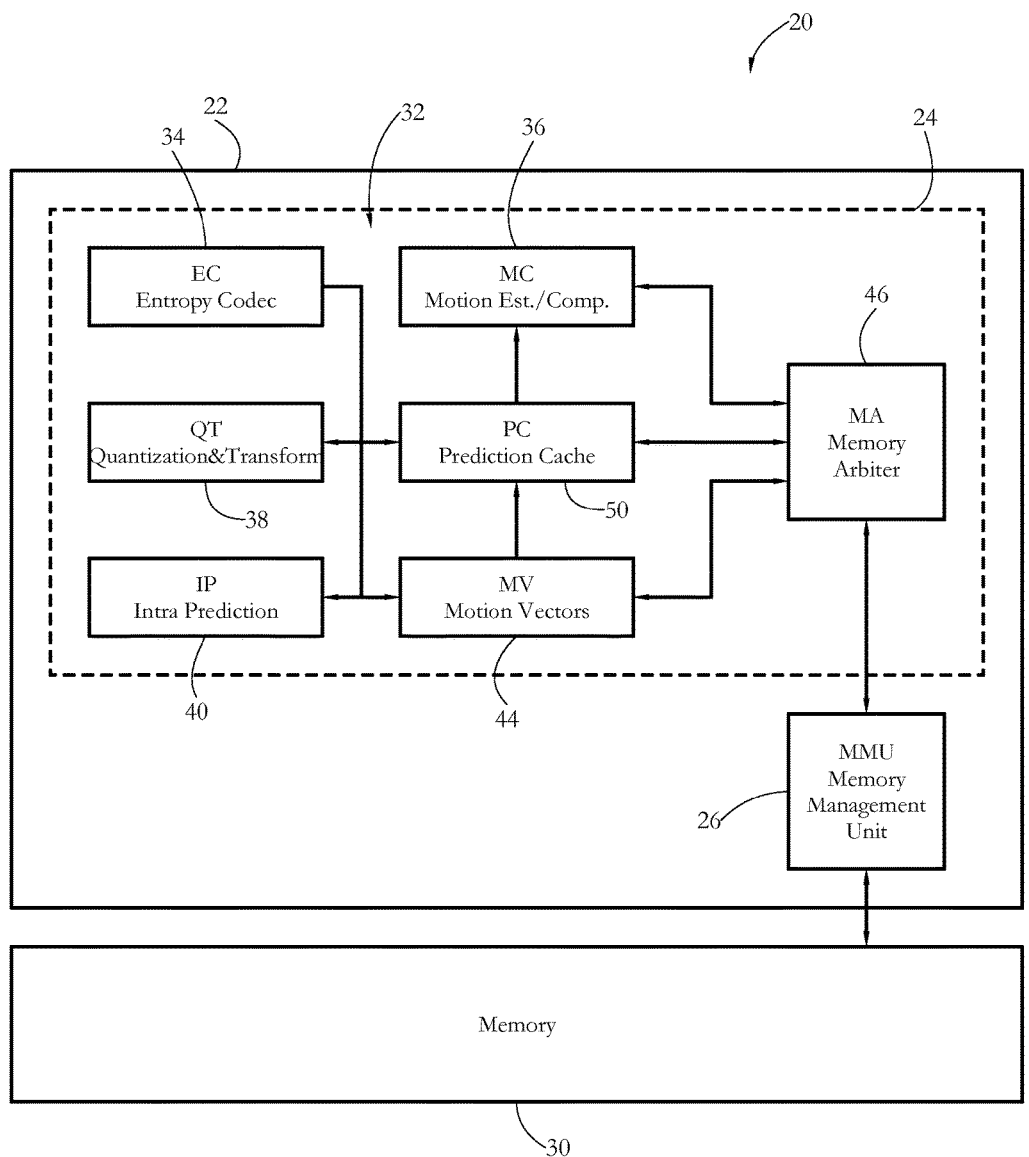
FIG. 1 shows an exemplary video coding (encoding and/or decoding) system including a video prediction cache, according to some embodiments of the present invention.

FIG. 1 shows an exemplary video coding (encoding and/or decoding) system 20 including a video prediction cache 50 according to some embodiments of the present invention. System 20 may include a video image encoder and/or a video image decoder. A video image encoder encodes a sequence of video frames (e.g. a movie) containing data in the pixel domain into a set of encoded video data blocks and associated parameters such as motion vectors and quantization parameters. Some of the blocks are encoded differentially with reference to other blocks. Reference blocks are commonly referred to as predictions. A video image decoder decodes encoded video image blocks to generate a sequence of pixel-domain video frames. The decoding process employs predictions to recover differentially-encoded data by adding residual and corresponding prediction data.

System 20 includes a processor integrated circuit (chip) 22 formed on a common semiconductor substrate, and a random access memory (RAM) 30. In some embodiments, RAM 30 may be provided off-chip, as shown in FIG. 1. In some embodiments, RAM 30 may be on-chip, within integrated circuit 22. RAM 30 may include a dynamic random access memory (DRAM) such as a double-data-rate synchronous DRAM (DDR SDRAM). Integrated circuit 22 includes a plurality of processor cores 24 (one is shown in FIG. 2), which are connected to memory 30 through a memory management unit (MMU) 26. Memory management unit 26 manages the memory access operations of multiple processor cores 24. Memory management unit 26 may also map 4-D (x, y, frame ID, color component) address vectors described below to linear memory addresses used by memory 30.

Each processor core 24 may include a set of special-purpose video processing units, described below. Each processor 24 may also include other components, such as a general-purpose processing pipeline. The description below focuses mainly on video processing units that may communicate directly with video prediction cache 50. An encoder and/or decoder may include other units known in the field of video coding.

Video coding units connected to video prediction (VP) cache 50 may include an entropy codec 34, a motion estimation/compensation unit 36, a quantization and transform unit 38, an intra-prediction unit 40, and a motion vector unit 44. Such units are known in the field of video coding. For example, a decoder may use a motion compensation unit, while an encoder may use a motion estimation unit. A memory arbiter 46 controls the access to MMU 26 of the various blocks of processor core 24, including VP cache 50. The width of the back-end bus connecting VP cache 50 to memory arbiter 46 may be chosen to accommodate the system memory bandwidth, while the width(s) of the front-end bus(es) connecting VP cache 50 to the other units of processor core 50 may be chosen to accommodate the processing performance characteristics of the processing units.

FIG. 2 shows the internal structure of video prediction (VP) cache 50 according to some embodiments of the present invention. VP cache 50 includes a cache controller 52, an address front end connecting cache controller 52 to various units of processor core 24, a memory back end 58 connecting cache controller 52 to memory (e.g. through memory arbiter 46), and a plurality of independently-addressable subcaches 60 storing cache data under the control of cache controller 52. A width of a cache back-end bus 59 defines a cache back-end word size. The cache-end back word size may be different from the word size of memory 30. For example, in some embodiments memory 30 may be a 32-byte memory, while back-end bus 59 may have a width of 64 bytes. In the discussion below, the terms "memory word" and "back-end word" refer to words received by VP cache 50 over cache back-end bus 59, and not necessarily to words as stored by memory 30 (in the example above, a memory word is 64 bytes, as defined by the width of cache back-end bus 59).

Subcaches 60 may be accessed independently on the same cycle, i.e. reading or writing in one subcache does not prevent reading and/or writing in another subcache on the same clock cycle. Subcaches 60 store different parts of any given cache back-end word, so that different parts of different back-end words may be retrieved synchronously (on the same cycle) from different subcaches 60 as described below.

FIG. 3-A shows an exemplary 16-byte cache back-end word 80 and associated 4×4-pixel video image prediction 86 according to some embodiments of the present. The 16-byte width of back-end word 80 is defined by the width of back-end bus 59. Cache controller 52 is configured to subdivide back-end word 80 into four 4-byte subwords 82(0-3), one for each subcache 60. Back-end word 80 stores video prediction data (one luma/chroma color component) for a 4×4-pixel block 86, with each pixel associated with 1 byte of data. Each 4-byte subword 82(0-3) stores the data of a corresponding 2×2-pixel block 88(0-3). The data of block 86 is thus distributed among 4 independently-addressable subcaches 60, and accessing (reading/writing) one of the subwords 82(0-3) does not require accessing the other subwords of back-end word 80 on the same clock cycle.

FIG. 3-B illustrates the storage of an exemplary sequence 90 of four 16-byte cache back-end words into four subcaches 60 each having a 4-byte (2×2) interface, according to some embodiments of the present invention. In a system in which each pixel corresponds to one byte of data, four-word sequence 90 encodes an 8×8 prediction (reference image block) 92. Prediction 92 is split into four 4×4 blocks 96, which may be held in internal cache-controller registers 94 prior to storage in subcaches 60 as described below. In some embodiments, each 4×4 block 96 has its own associated valid bit, and all four blocks 96 share a common cache tag as described below. Cache controller 52 splits each 4×4 block 96 into four 2×2 blocks 100, which are then distributed to four subcaches 60 as shown in FIG. 3-B, with each 2×2 quadrant of a 4×4 block 96 stored in a different subcache 60. An exemplary block 95 illustrates the distribution of data across subcaches 60. The thicker borders in FIG. 3-B facilitate tracking exemplary pixels/bytes (e.g. the top left 2×2 block in prediction 92) through the process described above. The four-word sequence 90 is thus stored as a single cache line including four sublines, each subline stored in a subcache 60. The cache line shares a common tag.

Figure 4:
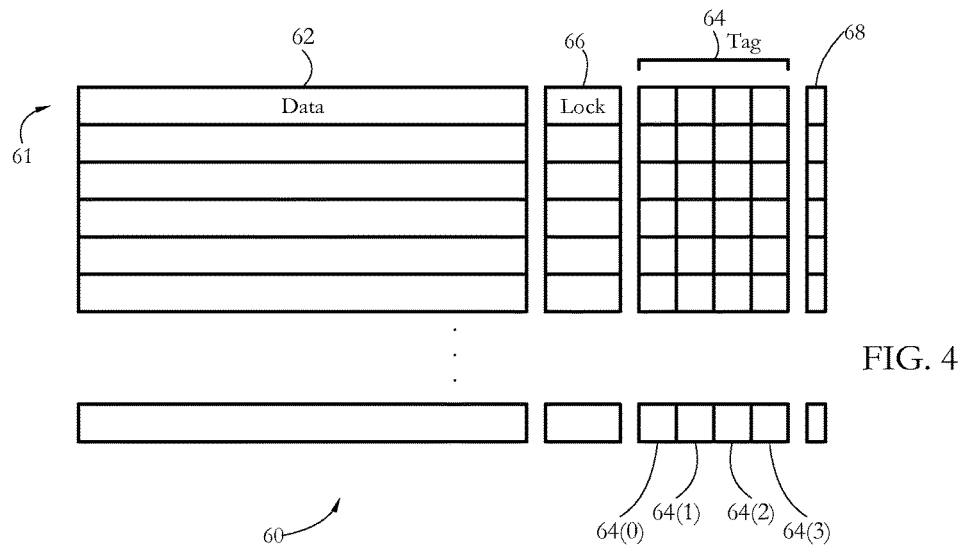
FIG. 4 shows the internal structure of an exemplary video prediction subcache according to some embodiments of the present invention.

FIG. 4 shows the internal structure of an exemplary video prediction subcache 60 and associated metadata (e.g. tag, lock number, and flag field) storage, according to some embodiments of the present invention. Subcache 60 includes a plurality of cache sublines 61, each forming part of a cache line distributed over the plurality of subcaches 60. For example, a 64-byte cache line may be distributed over four 16-byte subcaches 60 as four 16-byte sublines 61. The cache line may be equal in size to the back-end word size, or may be a multiple of the back-end bus width. For example, for a 16-byte back-end cache bus, the cache line size is at least 16 bytes, but may also be a multiple of 16-bytes, e.g. 64 bytes as illustrated above. Each subline 61 includes a data field 62, and may include or be characterized by a tag (address) field 64. In some embodiments, a common set of associated tag fields 64 are stored in a separate tag SRAM, and are associated with an entire cache line (i.e. with all sublines 61 across different subcaches). In some embodiments, each subline 61 of subcache 60 may be provided with its own tag storage.

A lock number (numlock) field 66 identifies a number of locks placed on a corresponding data block (shown in FIG. 3-B). The data of a cached block may be needed to produce the data of two or more (overlapping) image blocks; in such a situation, the data of a cached block is stored only once in subcache 60, and the lock number is incremented or decremented to keep track of the number of times that the data will be needed or has been used, respectively. The lock number is incremented when the associated data is needed for an additional prediction, and is decremented when the data has been sent out for a given prediction. The cache block is released (unlocked) when the lock number becomes zero.

A flag field 68 characterizes a data block as shown in FIG. 3-B. Flag field 68 may include a valid field indicating whether the associated data is valid, and a dirty field indicating whether the associated data has yet been written to memory. A dirty field may be particularly useful in video encoders and may not be needed in video decoders.

In some embodiments, tag field 64 includes 4 fields that identify particular prediction (reference block) data stored in a cache line: an x-address field 64(0), a y-address field 64(1), a frame identification field 64(2), and a color component (luma/chroma) field 64(3). Table 1 below shows an exemplary assignment of bits to such fields in an exemplary embodiment in which each tag field identifies an 8×8 pixel image block, corresponding to 64 bytes at 1-byte-per-pixel. After reset, the values of the fields in Table 1 may be initialized to 0.

TABLE 1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Reserved | | | | | | | | | NLock | | | Valid | | | | C | RefPicID | | | YAddr[11:6] | | | | | | XAddr[11:6] | | | | | |

| Field | Bits | Description |
|---|---|---|
| NumLock[1:0] | 22:21 | Number of Locks on the VPCache block |
| Valid[3:0] | 20:17 | Valid bits for 4x4 blocks in the VPCache 8x8 block |
| Chroma | 16 | Chroma is stored in the VPCache block (0 - luma; 1 - chroma) |
| RefPicID[3:0] | 15:12 | Reference Frame Id of the VPCache block |
| YAddr[VWIDTH−1: PC_VSIZE+5] | 11:6 | Vertical Address of the VPCache block |
| XAddr[HWIDTH−1: PC_HSIZE+6] | 5:0 | Horizontal Address of the VPCache block |

The x- and y-addresses identify the position within a video frame of the corresponding reference block (e.g. reference block 92 in FIG. 3-B). The frame identification field identifies the reference frame (out of a sequence of video frames) to which the data belongs. The color component field identifies whether the associated data is luma or chroma data. In some embodiments, the color component field may also identify a type of chroma (e.g. Cb or Cr).

In some embodiments, VP cache 50 is a 32-kB, 8-way associative 64×64 cache with a 128-bit back-end (memory subsystem) interface organized as 4×4 bytes. For example, 512 cache lines of 64 bytes each may be organized in 64 sets of 8 cache lines each. Such a cache allows storing a 64×64 array of bytes using one line from each set. In such an 8-way associative cache, the six least-significant bits of the x- and y-positions may serve as a cache index. A tag then includes the rest of the x- and y-positions (the most-significant bits), the frame ID, and the color components. Such a VP cache 50 may include four 2×2 VP subcaches 60, each with a 2×2 word organization. The front-end interface of VP cache 50 may be 4×4 bytes wide, aligned on a 2 pixel boundary.

Subcaches 60 may be implemented using four corresponding single-port 1024×64-byte static random access memory (SRAM) units for data storage, and one associated single-port 512×23-byte SRAM for the associated cache tags and/or other metadata. In some embodiments, dual port SRAMs (e.g. 2048×32-byte SRAMs) may be used for data storage, and possibly tag/metadata storage. In some embodiments, each subcache 60 may include its own separate tag memory.

When a prediction block is needed by a processing unit (e.g. by motion compensation/estimation unit 36), cache controller 52 subdivides the block in a number of 4×4 blocks aligned on multiple of 8×8 bytes, and searches the VP cache tag. The {Chroma, RefPicID, Yaddr, Xaddr} vector uniquely identifies an 8×8 VP cache tag block, and 4 tag bits may further identify each of four 4×4 subblocks of the 8×8 block.

Figure 5:
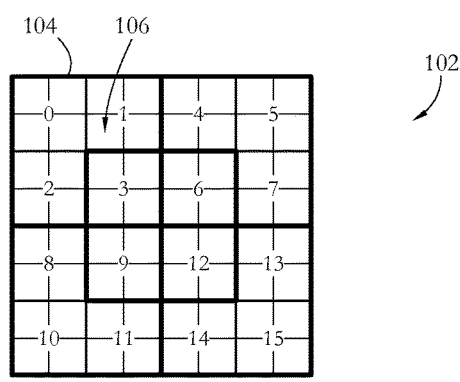
FIG. 5 illustrates a non-aligned cache data access according to some embodiments of the present invention.

The access speed advantages of a system employing multiple distributed prediction subcaches as described above may be understood by considering an exemplary prediction read/write. FIG. 5 illustrates a non-aligned cache data access according to some embodiments of the present invention. Consider an 8×8 image block 102 stored in a cache having a 16-byte back-end (memory subsystem) bus and 16-byte cache lines. Image block 102 is stored as four 4×4 words 104. Consider first an access (read/write) request for a 4×4 image block 106 which is not aligned with one of the words 104. In a cache system in which each word uses one cache line, accessing block 106 would be performed by accessing all words 104 sequentially, one after another, and then discarding the data that is not needed (the data outside block 106). By comparison, consider an access request for block 106 in a system having four parallel, independently-addressable 4×4 prediction caches as described above. In such a system, accessing (reading/writing) block 106 can be performed by synchronously (on the same clock cycle) accessing four 2×2 blocks (3, 6, 9 and 12 in FIG. 5) in the four corresponding sub-caches.

In some embodiments, smaller (e.g. 2) or larger numbers (e.g. 8, 16) of subcaches may be used. For example, 16 caches in a system with 16-byte words allow reading in one cycle any 16-byte unaligned word without incurring a time penalty. Using larger numbers of subcaches provides additional efficiency at the expense of complexity and/or cost.

Figure 6:
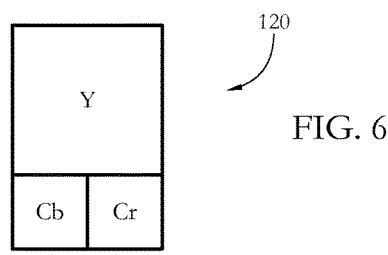
FIG. 6 illustrates luminance (luma) and chrominance (chroma) components of video data according to some embodiments of the present invention.

Video data is ordinarily stored as two or three color components: one luma (luminance) component, which represents the brightness (black and white, or achromatic part) of the picture, and one or two chroma (chrominance) component(s), which represent(s) the color information of the picture. Luma is commonly denoted as Y, while chroma is commonly denoted as C or (Cb, Cr), where Cb and Cr represent blue (Blue-Y) and red (Red-Y). Chroma may be sampled at a lower (e.g. 2× lower) frequency than luma. FIG. 6 illustrates the sizes of exemplary luma (Y) and chroma (Cb, Cr) components for a video prediction 120 according to some embodiments of the present invention. If the chroma resolution is half that of luma, each chroma component uses a quarter of the data used by luma. The chroma components may be combined into a common color component which uses half the data of its corresponding luma component. In some embodiments, an exemplary color component identifier (see identifier 64(3) in FIG. 4 and the exemplary color component (chroma) field listed in Table 1) may employ one bit (e.g. zero=luma, one=chroma) or two bits (e.g. one value each for Y, Cb and Cr).

Some video coding systems use a 4:2:0 chroma format with 8-bit luma and chroma components. The notation 4:2:0 signifies that the chroma components are downsampled 2× in each direction. Various other formats may also be used used in some embodiments, like 4:2:2 (chroma downsampled only on the horizontal direction, but not vertical) and 4:4:4 (no chroma downsampling). Also, 10-bit, 12-bit or higher luma and/or chroma components may be used in some embodiments.

FIG. 7 shows an exemplary 32-byte back-end cache word 300 and associated 8×4 video image prediction 302 in a system using 8 independently-addressable video prediction subcaches as described above, according to some embodiments of the present invention. In response to memory read operation performed for word 300, the cache controller divides word 300 into eight 2×2 blocks 304, and each of the eight blocks 304 is stored in a corresponding subcache. Subsequent cache access operations directed at one of the blocks 304 may be performed without accessing the other blocks 304.

The systems and methods described above allow addressing memory bandwidth challenges posed by the increasing demands of emerging video coding standards and applications. Under the emerging High-Efficiency Video Coding (HEVC, H.265) standard, luma prediction blocks can be of many sizes: 64×64, 64×32, 32×64, 64×48, 64×16, 48×64, 16×64, 32×32, 32×16, 16×32, 32×24, 32×8, 24×32, 8×32, 16×16, 16×8, 8×16, 16×12, 16×4, 12×16, 4×16, 8×8, 8×4, 4×8. Corresponding chroma blocks may be half the size in both directions. For smaller blocks, the per-byte overhead associated with a memory access operation is relatively high. In addition, a given block may be encoded with reference to more than one prediction. In the HEVC standard, 8×4 and 4×8 blocks may be encoded with reference to at most a single prediction. Larger blocks, such as 4×16, 8×8, and 16×4 blocks, may be encoded with reference to two predictions (bidirectionally interpolated). The overhead associated with conventional memory access operations may be particularly burdensome for such blocks.

In at least some HEVC embodiments, the motion vector resolution for luma is ¼-th of a pixel. When the motion vectors are not an integer number of pixels, a prediction is generated from original reference frame data by interpolation with a 7-tap filter for motion vectors with ¼ and ¾ fractional part, and an 8-tap filter for motion vectors with ½ fractional part. Because of the need for such interpolation, producing a 8×8 prediction may require fetching an 8×8, 14×8, 15×8, 8×14, 14×14, 15×14, 8×15, 14×15, or 15×15 block, depending on the motion vector. For a 15×15 block, the memory bandwidth required may be up to 225/64=3.52 times the bandwidth required for an 8×8 block.

For chroma, the motion vector resolution may be ⅛-th of a pixel. When the motion vectors are not an integer number of pixels, the prediction may be interpolated with a 4-tap filter. Because of the need for such interpolation, producing a 4×4 prediction may require fetching an 4×4, 7×4, 4×7, or 7×7 block, depending on the motion vector. For a 7×7 block, the memory bandwidth required may be up to 49/16=3.06 times the bandwidth required for a 4×4 block.

Some characteristics of DDR SDRAM (double data rate synchronous DRAM) increase the overhead associated with video prediction memory access operations. Common DDR2 memories use a 4n prefetch architecture, and common DDR3 and DDR4 memories use an 8n architecture. A ×16 DDR3 memory chip may fetch 128 bits or 16 bytes at a time, and a ×32 DDR3 may fetch 32 bytes at a time. For an 8×8 prediction, fetching a block of a size up to 15×15 from a 32-bit DDR3 could result in fetching 2×15 memory words=30*32=960 bytes, i.e. 960/64=15 times the bandwidth, for a regular memory word organization of 32×1. Such memory access times may make system performance unacceptably slow, or require high clock frequencies. High clock frequencies and their associated high power consumption are of particular concern in battery-powered devices such as smartphones and tablets.

A memory word array organization allows achieving improved memory bandwidth efficiencies. For a 32-bit DDR3, an 8×4 memory word organization may reduce the worst case bandwidth required for a 15×15 block (needed to generate an 8×8 prediction) to fetching 3×5 memory words=15*32=480 bytes, i.e. 480/64=7.5 times the memory bandwidth. Such a bandwidth is half that of a similar system using a 32×1 word organization, but such a bandwidth may still be unacceptable for emerging applications.

The efficiency of memory bandwidth usage may be increased for such DDR memories by fetching 4 or more memory words in a transaction, which may require 16 clock cycles for DDR3. For a 32-bit DDR3 memory device, at least 4 words means at least 128 bytes. Even if not all the fetched data is needed for a current prediction, the entire fetched data may be stored in a cache because of the high probability that some of the data will be needed to generate future predictions.

Increasing the front-end (processing-side) width of the video prediction cache bus may allow achieving improved system performance, but for a single-cache, linear-word organization, increasing the front-end bus width leads to diminishing returns. Consider the numbers of clock cycles needed to access a 15×15 block over a front-end cache bus of various widths. For a 1-byte front end VP cache bus, 15×15=225 cycles would be needed. If we double the motion compensation performance and front-end VP cache bus width to 2×1, the 15×15 block requires 8×15=120 cycles, i.e. 225/120=1.875 times faster. If we double one more time to 4×1, the 15×15 block requires at most 5×15=75 cycles, i.e. 225/75=3.00 times faster. If we use a 2×2 motion compensation organization, the 15×15 block requires 8×8=64 cycles, i.e. 225/64=3.52 times faster. If we double one more time to 8×1, the 15×15 block requires at most 3×15=45 cycles, i.e. 225/45=5.00 times faster. If we use a 4×2 motion compensation organization, the 15×15 block requires at most 5×8=40 cycles, i.e. 225/40=5.625 times faster. If we double one more time to 16×1, the 15×15 block requires 2×15=30 cycles, i.e. 225/30=7.50 times faster. If we use a 8×2 motion compensation organization, the 15×15 block requires at most 3×8=24 cycles, i.e. 225/24=9.375 times faster. If we use a 4×4 motion compensation organization, the 15×15 block requires at most 5×5=25 cycles, i.e. 225/25=9.00 times faster. If we double one more time to 32×1, the 15×15 block requires at most 2×15=30 cycles, i.e. 225/30=7.50 times faster. If we use a 16×2 motion compensation organization, the 15×15 block requires at most 2×8=16 cycles, i.e. 225/16=14.06 times faster. If we use a 8×4 motion compensation organization, the 15×15 block requires at most 3×5=15 cycles, i.e. 225/15=15.00 times faster. We notice that for a word line organization, beyond a certain width, the performance of the motion compensation does not improve no matter how wide we make the VP cache interface. For a word array organization, the performance improves further, but more slowly than the width increase; a 32-times wider VP cache bus can improve performance for a 15×15 block by up to 15 times, less than half the increase in bus width.

Using N×M independently-addressable VP subcaches as described above allows accessing cache data with improved alignment granularity. For a 32-byte total VP cache bus width and 2×1 VP subcaches each with 4×4 bus width, accessing a 15×15 block may use at most 3×5=15 cycles, i.e. 225/15=15.00 times faster than with a 1-byte bus. For 2×2 VP subcaches each with 4×2 bus width, the 15×15 block may use at most 3×4=12 cycles, i.e. 225/12=18.75 times faster. For 4×2 VP subcaches each with 2×2 bus width, the 15×15 block may use at most 2×4=8 cycles, i.e. 225/8=28.125 times faster. As can be seen from the exemplary numbers above, the performance improvements scale almost linearly with the VP cache width.

The operation of VP cache 50 according to some embodiments may be better understood by considering an exemplary read/write transaction initiated by a processing unit such as motion estimation/compensation unit 36 (FIG. 1). In response to receiving a read/write transaction, address front end 54 (FIG. 2) identifies which cache sets will be involved in servicing the transaction. Some cache sets may be used twice, for example for predictions with a size of 64 (64×64, 64×48, 48×64, 64×32, 32×64, 64×16, 16×64). VP cache controller 52 searches all tags in the identified set for a match. All tags in the set may be read in one cycle. If a match is found, VP cache controller 52 checks the corresponding lock number (NumLock) field (see Table 1). If the lock number is 3, the corresponding cache block already has the maximum numbers of locks, and VP cache controller 52 waits until NumLock is decremented. If the lock number is not 3, the corresponding cache block is locked by incrementing NumLock; after all requested data is sent on the front-end interface, the lock is removed by decrementing NumLock.

If no match is found, a FIFO or other replacement algorithm is used to decide which VP cache block to replace. To keep track of the oldest entry, VP cache controller 52 may employ 64 3-bit counters, one for each set that will be incremented after each block replacement. Before a request is sent to memory back-end 58, VP cache controller 52 waits for all locks to be removed (NumLock==0); at that time, the VP cache block is locked by incrementing NumLock. The VP cache block is unlocked by decrementing NumLock when all requested prediction data is sent on the front-end interface.

Memory back-end 58 back-end sends back-end transactions to memory. For each memory transaction in flight, memory back-end 58 keeps track of how much data is expected and to which VP cache blocks the data should be stored. Address front-end 54 sends prediction data to the requesting unit as soon as it is available.

In some embodiments, a system employing multiple sub-word subcaches as described above may be used with a conventional (linear) cache addressing (tag) scheme, rather than a 4-D (x, y, frame ID, and color component) cache-addressing scheme as described above. Such a system may also be used to cache non-image data used by a processor.

The above embodiments may be altered in many ways without departing from the scope of the invention. Accordingly, the scope of the invention should be determined by the following claims and their legal equivalents.

What is claimed is:

1. An apparatus, comprising:
    a memory;
    a plurality of cache memories; and
    a cache controller coupled to the plurality of cache memories, wherein the cache controller is configured to:
        receive a cache word from a memory, wherein the cache word includes video prediction data for a pixel block;
        subdivide the cache word into a plurality of subwords, wherein each subword of the plurality of subwords includes video prediction data of a corresponding quadrant of the pixel block, wherein each subword is associated with a respective valid data bit and a respective tag of a plurality of tags, and wherein a respective value of at least a portion of each tag of the plurality of tags includes an indication of a type of chroma data included in video prediction data of an associated quadrant of the pixel block; and
        store a particular subword of the plurality of subwords into a respective cache memory of a plurality of cache memories.

2. The apparatus of claim 1, wherein the cache controller is further configured to increment a lock number field associated with a given subword stored in a particular cache memory in response to determining the video prediction data associated with the given subword is used in an additional overlapping image block.

3. The apparatus of claim 1, wherein a particular cache memory of the plurality of cache memories includes a plurality of lines, wherein each line of the plurality of lines includes a data field and a tag field.

4. The apparatus of claim 1, wherein the video prediction data for the pixel block includes at least a luma component and a chroma component for the pixel block.

5. The apparatus of claim 1, wherein the cache controller is further configured to:
receive a request for a prediction block, wherein the prediction block is associated with an identification number, a chroma value, an x-address, and a y-address;
subdivide the prediction block into multiple sub-blocks; and
search the plurality of cache memories using a plurality of tag bits stored in cache memories and the identification number, the chroma value, the x-address, and the v-address, wherein a particular tag bit is associated with a respective sub-block of the multiple sub-blocks.

6. The apparatus of claim 1, wherein the pixel block includes an array of 4 pixels by 4 pixels.

7. The apparatus of claim 6, wherein the video prediction data associated with the corresponding quadrant of the pixel block includes video prediction data for a 2 pixel by 2 pixel array.

8. A method, comprising:
receiving, by a cache controller, a cache word from a memory, wherein the cache word includes video prediction data for a pixel block;
subdividing, by the cache controller, the cache word into a plurality of subwords, wherein each subword of the plurality of subwords includes video prediction data of a corresponding quadrant of the pixel block, wherein each subword is associated with a respective valid data bit and a respective tag of a plurality of tags, and wherein a respective value of at least a portion of each tag of the plurality of tags includes an indication of a type of chroma data included in video prediction data of an associated quadrant of the pixel block; and
storing a particular subword of the plurality of subwords into a respective cache memory of a plurality of cache memories.

9. The method of claim 8, further comprising incrementing a lock number field associated with a given subword stored in a particular cache memory in response to determining the video prediction data associated with the given subword is used in an additional overlapping image block.

10. The method of claim 8, wherein a particular cache memory of the plurality of cache memories includes a plurality of lines, wherein each line of the plurality of lines includes a data field and a tag field.

11. The method of claim 8, wherein the video prediction data for the pixel block includes at least a luma component and a chroma component for the pixel block.

12. The method of claim 8, wherein the pixel block includes an array of 4 pixels by 4 pixels.

13. The method of claim 12, wherein the video prediction data associated with the corresponding quadrant of the pixel block includes video prediction data for a 2 pixel by 2 pixel array.

14. A system, comprising:
a video prediction cache including a plurality of sub-caches;
a motion/compensation unit coupled to the video prediction cache;
wherein the video prediction cache is configured to:
receive a cache word from a memory, wherein the cache word includes video prediction data for a pixel block;
subdivide the cache word into a plurality of subwords, wherein each subword of the plurality of subwords includes video prediction data of a corresponding quadrant of the pixel block, wherein each subword is associated with a respective valid data bit and a respective tag, and wherein a respective value of at least a portion of each tag of the plurality of tags includes an indication of a type of chroma data included in video prediction data of an associated quadrant of the pixel block; and
store a particular subword of the plurality of subwords into a respective sub-cache of the plurality of sub-caches.

15. The system of claim 14, wherein the video prediction cache is further configured to increment a lock number field associated with a given subword stored in a sub-cache in response to a determination that the video prediction data associated with the given subword is used in an additional overlapping image block.

16. The system of claim 14, wherein a particular sub-cache of the plurality of sub-caches includes a plurality of lines, wherein each line of the plurality of lines includes a data field and a tag field.

17. The system of claim 14, wherein the video prediction data for the pixel block includes at least a luma component and a chroma component for the pixel block.

18. The system of claim 14, wherein the video prediction cache is further configured to:
receive a request for a prediction block, wherein the prediction block is associated with an identification number, a chroma value, an x-address, and a y-address;
subdivide the prediction block into multiple sub-blocks; and
search the plurality of sub-caches using a plurality of tag bits stored in cache memories and the identification number, the chroma value, the x-address, and the y-address, wherein a particular tag bit is associated with a respective sub-block of the multiple sub-blocks.

19. The system of claim 14, wherein the pixel block includes an array of 4 pixels by 4 pixels.

20. The system of claim 19, wherein the video prediction data associated with corresponding quadrant of the pixel block includes video prediction data for a 2 pixel by 2 pixel array.

* * * * *